(12) United States Patent
Hardman et al.

(10) Patent No.: US 11,725,926 B2
(45) Date of Patent: Aug. 15, 2023

(54) ATOM INTERFEROMETER

(71) Applicant: NOMAD ATOMICS PTY LTD, Action (AU)

(72) Inventors: Kyle Sage Hardman, Lyneham (AU); Christian Michael Freier, Dickson (AU); Paul Benjamin Wigley, Latham (AU); Nicholas Peter Robins, Michelago (AU)

(73) Assignee: Nomad Atomics Pty Ltd, Acton Act (AU)

( * ) Notice: Subject to any disclaimer, the term of this patent is extended or adjusted under 35 U.S.C. 154(b) by 0 days.

(21) Appl. No.: 17/413,822

(22) PCT Filed: Dec. 16, 2019

(86) PCT No.: PCT/AU2019/051384
§ 371 (c)(1),
(2) Date: Jun. 14, 2021

(87) PCT Pub. No.: WO2020/124134
PCT Pub. Date: Jun. 25, 2020

(65) Prior Publication Data
US 2022/0018650 A1    Jan. 20, 2022

(30) Foreign Application Priority Data
Dec. 17, 2018  (AU) ................. 2018904789

(51) Int. Cl.
*G01B 9/02* (2022.01)
*G01B 9/02001* (2022.01)

(52) U.S. Cl.
CPC ..... *G01B 9/02001* (2013.01); *G01B 9/02041* (2013.01); *G01B 2290/55* (2013.01)

(58) Field of Classification Search
CPC ........... G01B 9/02001; G01B 9/02041; G01B 2290/55; G01C 19/58; G01P 15/093; G01P 15/06; G21K 1/006; G01V 7/00
See application file for complete search history.

(56) References Cited

U.S. PATENT DOCUMENTS 4,874,942 A    10/1989 Clauser
9,018,579 B2    4/2015 Kasevich et al.
(Continued)

OTHER PUBLICATIONS

H. Müntinga et al. "Interferometry with Bose-Einstein Condensates in Microgravity" Phys. Rev. Lett. 110, 093602—Published Feb. 25, 2013 (Year: 2013).*
(Continued)

*Primary Examiner* — Hwa Andrew Lee
(74) *Attorney, Agent, or Firm* — Loza & Loza, LLP; David S. Sarisky

(57) ABSTRACT

The present application relates to an atom interferometry method. The atom interferometry method releases atoms from an atom source into an interferometer region. Pulses of light are then directed at the atoms to place the atoms in different quantum states and to recombine the quantum states such that the recombined quantum states interfere with each other when the quantum states are overlapped spatially. The recombined quantum states creates a spatial fringe pattern with a phase. The spatial fringe pattern and the phase of the spatial fringe pattern are detected when the quantum states are overlapped spatially. The overlapped spatial fringe pattern is then used to measure physical quantities such as local gravity, the gravitational constant, the fine structure constant, the ratio of Planck's constant to the atomic mass, rotation of the atom interferometer, acceleration of the atom interferometer, and the like.

19 Claims, 10 Drawing Sheets

(56) References Cited

U.S. PATENT DOCUMENTS

2011/0101972 A1 5/2011 Narducci et al.
2021/0319925 A1* 10/2021 Cheiney ................ G01P 15/093

OTHER PUBLICATIONS

PCT/AU2019/051384. International Search Report & Written Opinion dated Jun. 26, 2020 (dated Jun. 25, 2020), pp. 1-13.
Hardman et al. "Simultaneous Precision Gravimetry and Magnetic Gradiometry with a Bose-Einstein Condensate: A High Precision, Quantum Sensor", Physical Review Letters, vol. 117, No. 13- 23, 138501, Sep. 21, 2016 (Sep. 21, 2016), pp. 1-5.
Hardman "A BEC Based Precision Gravimeter and Magnetic Gradiometer: Design and Implementation", PHD Thesis Australian National University, Dec. 31, 2016 (Dec. 31, 2016), pp. 1-160.
Wigley et al. "Readout-delay-free Bragg atom interferometry using overlapped spatial fringes", Physical Review A, vol. 99, No. 2, 023615, Feb. 11, 2019 (Feb. 11, 2019), pp. 1-6.

* cited by examiner

US 11,725,926 B2

ATOM INTERFEROMETER

TECHNICAL FIELD

The present invention relates generally to an atom interferometer. The present invention also relates to a method for operating the atom interferometer, and to a computer program product including a computer readable medium having recorded thereon a computer program for operating the atom interferometer.

BACKGROUND

An atom interferometer is a tool for accurately measuring physical quantities such as local gravity, the gravitational constant, the fine structure constant, the ratio of Planck's constant to the atomic mass, rotation of the atom interferometer, acceleration of the atom interferometer, and the like.

Atom interferometers can employ Raman transitions to generate the mirror and beamsplitters light pulses required for the interferometry sequence. This two-photon process couples atoms in different internal quantum states in addition to providing a momentum kick. Whilst different internal quantum states allow the interferometer outputs to be measured independently without requiring quantum state separation, such an atom interferometer is susceptible to systematic shifts from electromagnetic gradients and require careful shielding from external fields.

Atom interferometers can also use Bragg transitions, which couple only between external quantum states (e.g., momentum states). However, atom interferometers using Bragg transitions require separation of the external quantum states at the output before measurement can be taken. The required separation delays the detection of the external quantum states (e.g., momentum states) and limits the possible sensitivity for a given free-fall distance or apparatus size. Large momentum transfer (LMT) interferometry mitigates this effect, but increases the laser phase noise.

FIG. 2A shows an example of the travel paths of different quantum states of atoms in a conventional Bragg-transition atom interferometer with spatial fringes. When atoms are released from the atom source, the atoms are placed into different quantum states, which travel at different paths 270, 280 in the interferometer region. The quantum states of the atoms then overlap and separate completely before being measured by the detector. As shown in FIG. 2A, there is a separation delay which is the time taken when the quantum states overlap and when the quantum states completely separate. As discussed above, the separation delay hold-ups the measurement of the quantum states and limits the possible sensitivity for a given free-fall distance or apparatus size.

SUMMARY

It is an object of the present invention to substantially overcome, or at least ameliorate, one or more disadvantages of existing arrangements.

The present disclosure relates to an atom interferometer that does not require the quantum states of atoms to separate in space before detection. An aspect of the disclosed atom interferometer provides an additional benefit of single shot phase readout.

In one arrangement, the atom interferometer uses an asymmetric Mach-Zehnder method for creating a spatial fringe pattern at the output. The spatial fringe pattern is detected when the quantum states of the atoms overlap spatially and the spatial fringe patterns of both output ports are in phase. Therefore, the atom interferometer of the present disclosure does not require the quantum states to separate in space before being detected, thereby reducing detection delay.

In another arrangement, the Bragg-transition atom interferometer uses laser rotation to create the spatial fringe pattern when the quantum states of the atoms overlap spatially. The spatial fringe pattern enables the quantum states of the atoms to be detected.

According to one aspect of the present disclosure, there is provided an atom interferometry method comprising: releasing atoms from an atom source into an interferometer region; directing pulses of light at the atoms to place the atoms in different quantum states and to recombine the quantum states such that the recombined quantum states interfere with each other when the quantum states are overlapped spatially, the recombined quantum states creating a spatial fringe pattern with a phase; and detecting the spatial fringe pattern and the phase of the spatial fringe pattern when the quantum states are overlapped spatially.

According to another aspect of the present disclosure, there is provided an atom interferometer comprising: an atom source configured for releasing atoms from an atom source into an interferometer region; a laser system configured for directing pulses of light at the atoms to place the atoms in different quantum states and to recombine the quantum states such that the recombined quantum states interfere with each other when the quantum states are overlapped spatially, the recombined quantum states creating a spatial fringe pattern with a phase; and a detector configured for detecting the spatial fringe pattern and the phase of the spatial fringe pattern when the quantum states are overlapped spatially.

According to another aspect of the present disclosure, there is provided a computer program product including a computer readable medium having recorded thereon a computer program for implementing any one of the methods described above.

Other aspects are also disclosed.

BRIEF DESCRIPTION OF THE DRAWINGS

At least one embodiment of the present invention will now be described with reference to the drawings and appendices, in which.

DETAILED DESCRIPTION

Figure 1:
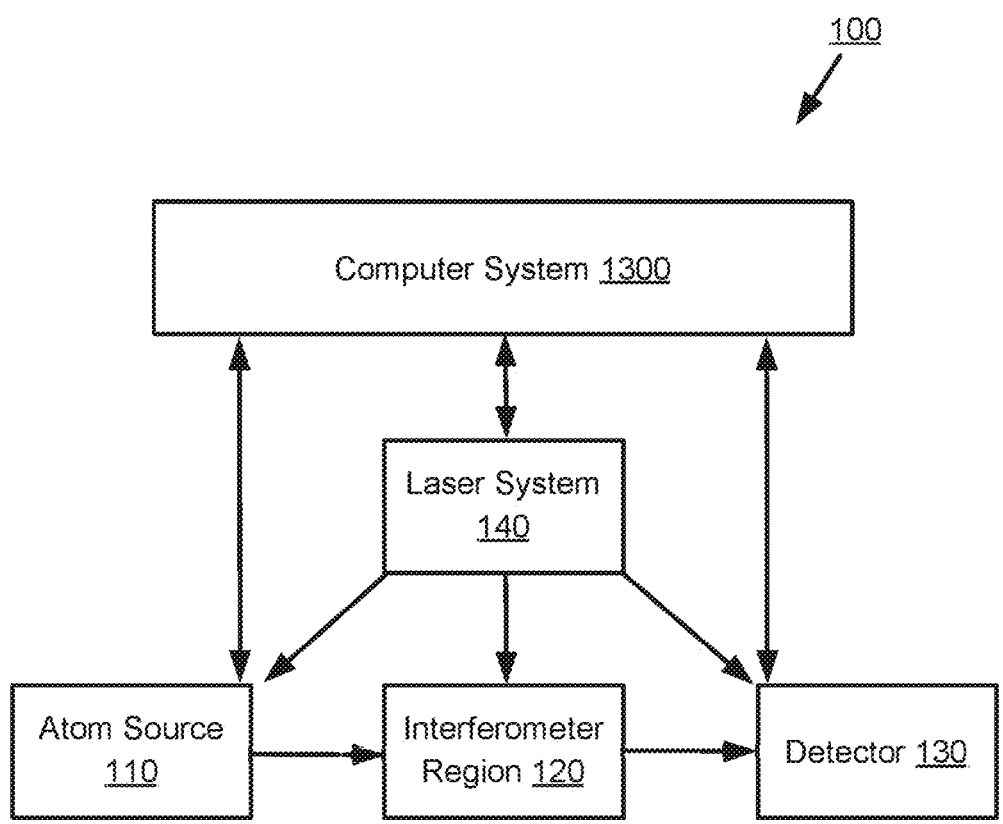
FIG. 1 shows an atom interferometer according to the present disclosure.

Where reference is made in any one or more of the accompanying drawings to steps and/or features, which have the same reference numerals, those steps and/or features have for the purposes of this description the same function (s) or operation(s), unless the contrary intention appears.

It is to be noted that the discussions contained in the "Background" section and that relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

FIG. 1 shows a schematic block diagram of an atom interferometer 100 according to the present disclosure. The atom interferometer 100 includes an atom source 110, an interferometer region 120, a detector 130, a laser system 140, and a computer system 1300.

Atom Source 110

The atom source 110 is configured to provide atoms to be released into the interferometer region 120. The laser system 140 provides laser light to the atom source 110 for the operation of a magneto optical trap (MOT). The computer system 1300 controls the atom source 110 for releasing the atoms. The computer system 1300 also controls the laser system 140 for providing the laser to operate as the optical trap.

The atom source 110 is an ultra-high vacuum system with a background pressure of less than $10^{-9}$ torr.

The atom source 110 confines a thermal sample of $^{87}Rb$ atoms. The thermal sample is then cooled using a two-dimensional MOT before being transferred through a high impedance line to an ultrahigh vacuum 3D MOT where further cooling is achieved. After 6 seconds, a sample of $5\times10^9$ atoms is acquired before undergoing a compression and polarization gradient cooling stage, lowering the temperature to about 20 μK. The atoms are then loaded into a hybrid magnetic quadrupole and crossed optical dipole trap, where an initial stage of evaporation is completed using a microwave knife over 4.5 seconds leaving $4\times10^7$ atoms at 4 μK. The magnetic field gradient is subsequently decreased from 150 G/cm to 25 G/cm over 200 ms until the atoms are no longer supported against gravity, allowing efficient loading into the crossed optical dipole trap with the magnetic field subsequently extinguished. The use of this hybrid trap facilitates spatial mode matching from the MOT stage to the dipole trap stage, enabling a higher final atom number to be achieved.

The dipole trap is performed using the laser system 140. The laser system 140 generates a pair of 1064 nm broad linewidth laser beams intersecting at 22.5° each with waists of 300 μm. By reducing the intensity of both beams over 2 seconds, forced evaporation results in a pure $|F=1,m_j=-1\rangle$ $=2\times10^6$ atom condensate (i.e., Bose Einstein condensate (BEC)) with an in-trap width of approximately 50 μm and an effective temperature of about 50 nK. The dipole trap is then removed (i.e., the laser system 140 stops providing laser beams to the atom source 110) and the condensed atoms fall under gravity.

In another arrangement, non-condensed atoms are used for the atom source 110 where the atoms are not condensed at the time of release.

In another arrangement, a magnetic superposition of the atoms of $|m_j=1,0,-1\rangle$ may then be generated using Raman transitions through the use of a pair of far-detuned, co-propagating linearly polarized beams, pulsed at intervals of 2.2 ms after release from the atom source 110. The beams are provided by the laser system 140. The atoms then enter the interferometer region 120.

In another arrangement, the atoms entering the interferometer region 120 may be placed in other quantum states such as hyper-fine states, angular momentum states, and linear momentum states. Hereinafter, the atoms may be placed in any quantum states, but for simplicity sake the discussions will refer to a particular quantum state.

The timing of the steps performed by the atom source 110 is controlled by the computer system 1300.

Interferometer Region 120

The interferometer region 120 is a region through which the released atoms travel. The laser system 140 provides pulses of light directed at the travelling atoms so that the travelling atoms are placed in different quantum states. At the end of the interferometer region 120, a spatial fringe pattern is created when the quantum states overlapped spatially. The computer system 1300 controls the laser system 140 for providing the light pulses.

The laser system 140 provides the light pulses such that the time period between the pulses are asymmetric to create the spatial fringe pattern. In other words, there is temporal asymmetry when directing the light pulses at the atoms travelling through the interferometer region 120.

In another arrangement, one or more of the light pulses provided by the laser system 140 are rotated relative to each other to create the spatial fringe pattern.

The interferometer region 120 is an ultra-high vacuum system with a background pressure of less than $10^{-9}$ torr.

The Detector 130

The detector 130 is positioned at the end of the interferometer region to detect the spatial fringe pattern when the quantum states of the atoms overlapped spatially. The computer system 1300 controls the laser system 140 for providing light to the detector 130 to capture the spatial fringe pattern.

The detector 130 may be charged-coupled device (CCD) cameras, complementary metal-oxide-semiconductor (CMOS) cameras, a photo-diode, or a photo multiplier tube (PMT).

Laser System 140

The laser system 140 includes different types of laser. One type of lasers in the laser system 140 is used to operate as MOT for the atom source 110. Another type of lasers is used to provide light pulses at the atoms travelling through the interferometer region 120 to create the spatial fringe pattern. Another type of lasers is used to provide light to the detector 130 for detecting the spatial fringe pattern.

Computer System 1300

The computer system 1300 controls the operation of the atom source 110, the laser system 140, and the detector 130. The computer system 1300 performs such controls by sending control signals to the respective devices 110, 130, 140 to perform certain functions (e.g., releasing of atoms, providing the light pulses, etc.).

The structure of computer system 1300 is described below.

In another arrangement, the computer system 1300 may be replaced with analog hardware. For example, an oscillator may be used to trigger the light pulses generated by the laser system 140 to control the atom source 110, to direct light pulses when the atoms are in the interferometer region 120, and to control the detector 130.

Therefore, a controller configured to control the atom source 110, the laser system 140, and the detector 130 can be the computer system 1300 or analog hardware.

Figure 8:
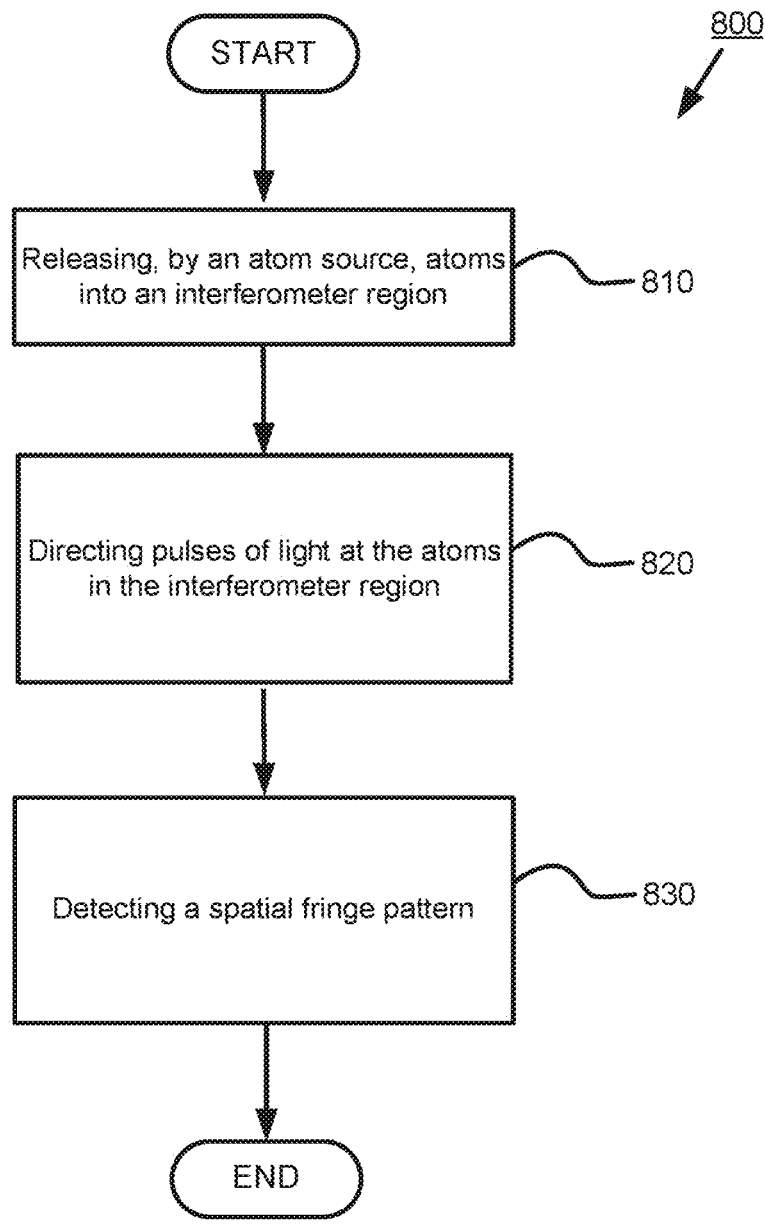
FIG. 8 is a flow chart diagram of a method of operating the atom interferometer of the present disclosure.

FIG. 8 shows a flow chart of a method 800 of operating the atom interferometer 100. Method 800 can be implemented as one or more software application programs 1333 (see FIG. 9A and discussed below) that are executable by a processor 1305 (see FIG. 9A and discussed below).

Method 800 commences at step 810 by releasing atoms from the atom source 110. The atoms released by the atom source 110 then proceed into the interferometer region 120. Method 800 then proceeds from step 810 to step 820.

In step 820, the laser system 140 directs pulses of light at the atoms travelling through the interferometer region 120. Upon receiving the light pulses, the atoms are placed into different quantum states. The light pulses then recombine the quantum states such that the recombined quantum states interfere with each other when the quantum states are overlapped spatially. The recombined quantum states create a spatial fringe pattern having a phase if an asymmetry in the interferometer sequence is applied (as described below). The recombination of the quantum states occurs at the end of the interferometer region 120, where, given this asymmetry, a spatial fringe pattern is created when the quantum states are recombined when the quantum states overlap spatially and interfere with each other.

The spatial fringe pattern is created when the time period between the light pulses directed at the atoms in the interferometer region 120 are asymmetric.

Figure 2A:
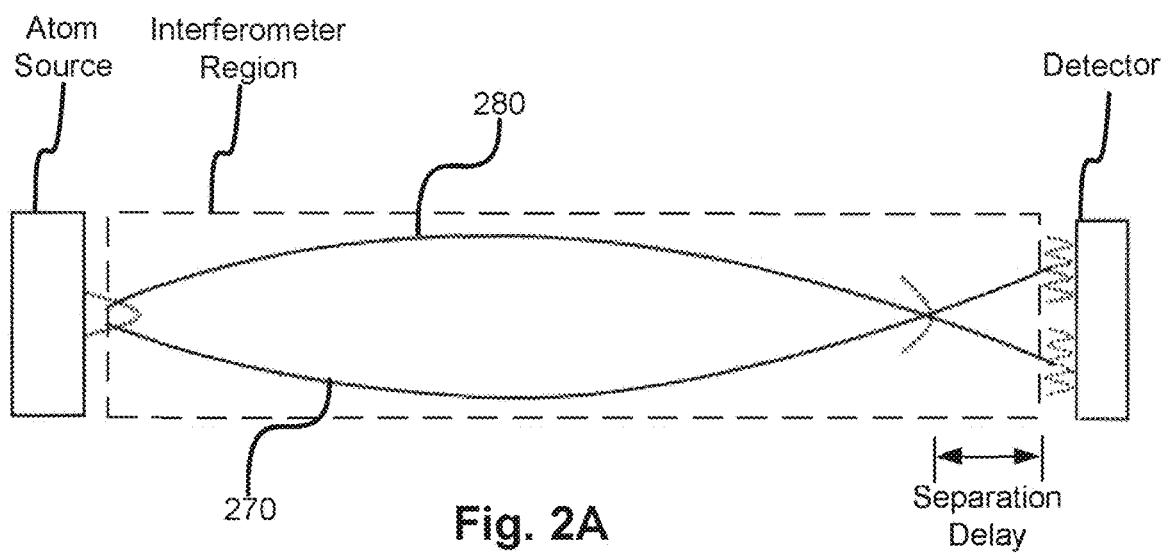
FIG. 2A illustrates travel paths of different quantum states of atoms in an interferometer region of a conventional atom interferometer with spatial fringes.
Figure 2B:
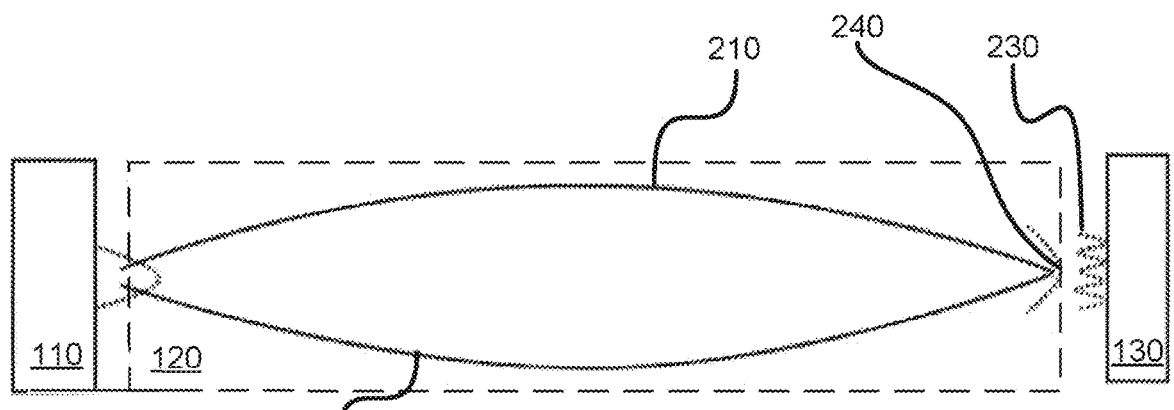
FIG. 2B is a diagram of travel paths of different quantum states of atoms in an interferometer region of an atom interferometer according to the present disclosure.

FIG. 2B shows an illustration of different quantum states travelling through paths 210 and 220 in the interferometer region 120. When the quantum states overlapped spatially at the end 240 of the interferometer region 120, a spatial fringe pattern 230 is created. In comparison with the travel paths shown in FIG. 2A, the atom interferometer 100 does not require the quantum states of the atoms to separate before detection. Therefore, the atom interferometer 100 does not have the separation delay of a conventional Bragg-transition atom interferometer.

Figure 3:
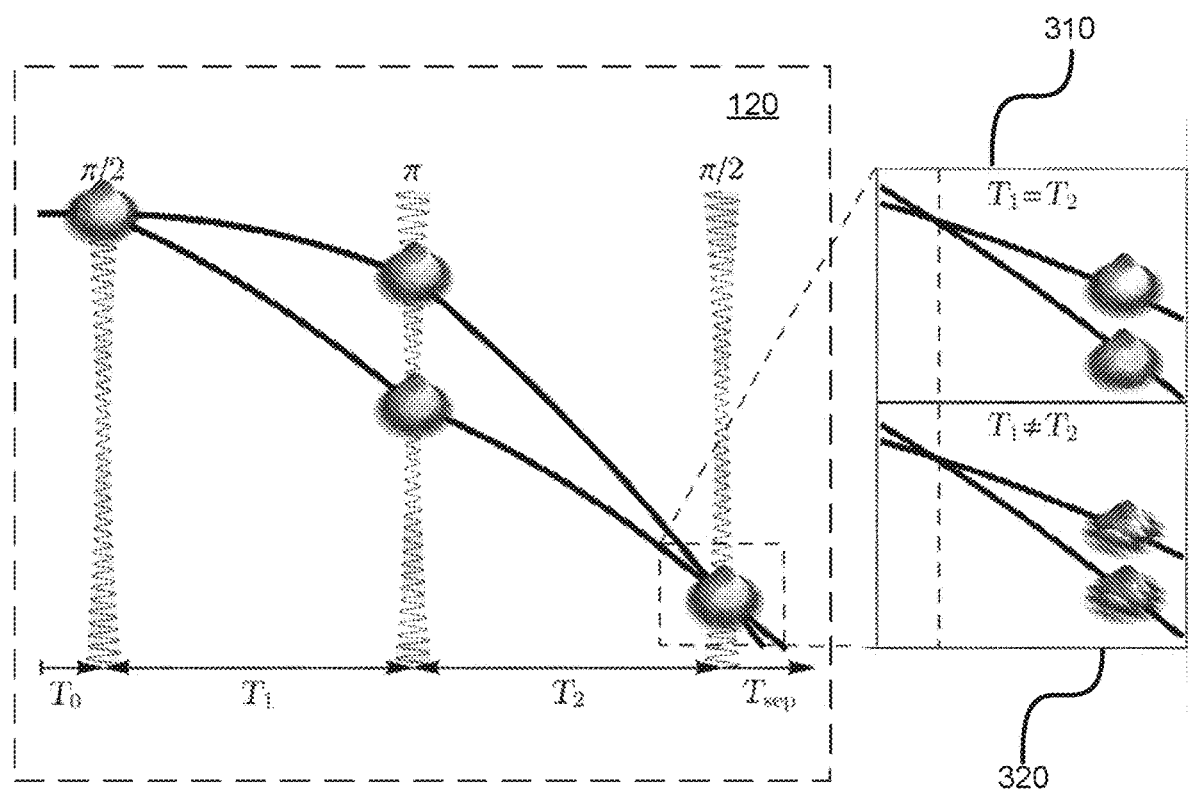
FIG. 3 illustrates the travel paths of the atoms of FIG. 2B according to an arrangement of the present disclosure.

FIG. 3 shows an illustration of FIG. 2B with the pulses of light being directed at the atoms. A Mach-Zehnder atom-interferometer sequence is used for directing the pulses of light. A Bose-Einstein condensate of atoms is released into the interferometer region 120.

A Bragg lattice is used to place the atoms into two quantum states at T=0. A vertically oriented Bragg lattice is generated with two frequency shifted counter propagating beams of same polarization. Such a Bragg lattice enables each magnetic substate to be placed into a momentum state, forming the interferometer components. Although all three magnetic substates could form unique simultaneous interferometers, only the magnetically insensitive $m_F$=0 state is considered here.

After time T1 a light pulse is applied to swap the quantum states. The light pulse applied at time T1 is known as the mirror light pulse.

After time T2, a light pulse is applied to recombine and interfere the quantum states of the atoms. The light pulse applied at time T2 is known as the beamsplitter light pulse. Different output states are generated depending on $\delta T = T_1 - T_2$.

When $\delta T = 0$ (i.e., in atom interferometers without spatial fringes) the quantum states are output with the relative population providing phase information. When $\delta T \neq 0$ (i.e., in the atom interferometer 100) a spatial fringe pattern is observed with the phase of the spatial fringe pattern providing information on the difference in paths 210 and 220.

The light pulses in FIG. 3 are detuned Bragg pulses, with one beam frequency chirped to account for an increasing Doppler shift resulting from the accelerating atoms. The other beam is adjusted to address the resonance frequency required for transfer of $2\hbar k$ of momentum, where is the reduced Planck constant and $k = \pi/\lambda$ is the wavenumber of the light of wavelength A. The laser system 140 generates the light through a frequency doubled 1560 nm fiber amplifier system using a seed with a narrow 10 Hz linewidth. Bragg pulses with 50 μs full width half maximum are used to couple the atoms to the $2\hbar k$ momentum state. The inertial reference is provided by a custom retro-reflector passively isolated from ground vibrations through the low frequency mechanical oscillator of a geometric anti-spring system.

The Stern-Gerlach pulse (not shown in FIG. 3) is used to separate the different magnetic substates at the culmination of the interferometer sequence. The Stern-Gerlach pulse is a magnetic gradient that is generated by switching a magnetic field for a short period of time (e.g., about 5 ms.

In the present disclosure, the Stern-Gerlach pulse is applied before the end of the interferometer region 120, as the noise analysis is only concerned with the magnetically insensitive states. In this case, the other two magnetic substates do not participate in simultaneous interferometers. In another arrangement, it is possible to apply the Stern-Gerlach pulse before the first of the light pulses from the laser system 140 is directed at the atoms.

In another arrangement, the Stern-Gerlach pulse is not applied.

Although three pulses are shown in the example above, it is possible to direct less or more than three pulses of light at the atoms in the interferometer region 120 to create a spatial fringe pattern at the end of the interferometer region 120.

In another arrangement, the light pulses are rotated relative to each other to create the spatial fringe pattern. The light pulse is rotated by tipping or tilting the reference mirror or the Bragg light outcouple, or any combination of these, during the interferometer sequence (i.e., when atoms are travelling through the interferometer region 120).

Method 800 proceeds from step 820 to step 830.

In step 830, the detector 130 (which is placed at the end of the interferometer region 120) detects the spatial fringe pattern created during the overlap of the quantum states of the atoms. The laser system 140 provides resonant light to the detector to detect the overlap atoms (discussed below).

The interferometer region 120 allows the atoms to travel through the region 120 for a time period known as time-of-flight ($T_{TOF}$). A number of imaging techniques is available for different $T_{TOF}$. In one example, absorption imaging on CCD cameras allows for 2D images using interferometer times up to Ti=90 ms. In another example, frequency modulation imaging (FMI) on a photo diode allows for 1D density signals for all other possible interferometer times. The interferometer time Ti is given by Ti=(T1+T2)/2.

Figure 4:
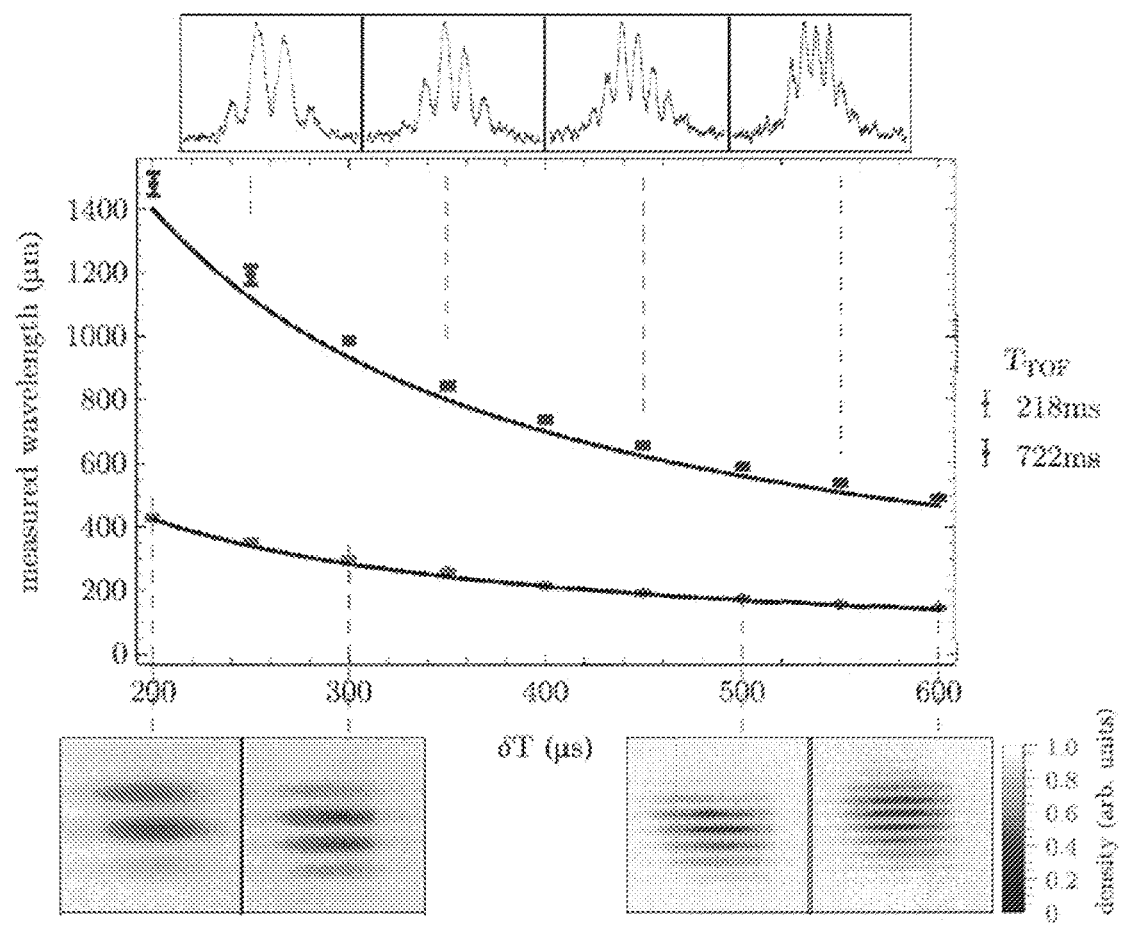
FIG. 4 shows a comparison of different spatial fringe patterns captured by the detector at different total time of flight and different temporal asymmetry of the pulses.

FIG. 4 shows a comparison of the different spatial fringe patterns captured by the detector 130 at different $T_{TOF}$ and different temporal asymmetry of the pulses. In particular, FIG. 4 shows two $T_{TOF}$ of 218 ms and 722 ms, where the x-axis shows the different temporal asymmetry δT and the y-axis shows the measures wavelength of the spatial fringe patterns. The different spatial fringe patterns detected at $T_{TOF}$ of 218 ms at different temporal asymmetry δT is shown at the bottom of FIG. 4. The different spatial fringe patterns detected at $T_{TOF}$ of 722 ms at different temporal asymmetry δT is shown at the top of FIG. 4.

The spatial fringe patterns when the $T_{TOF}$ is 218 ms were obtained using absorption imaging with raw single run images. The spatial fringe patterns when the $T_{TOF}$ is 722 ms were obtained using FMI with single run images and a Savitzky-Golay filter.

The data shown in FIG. 4 is the mean measured wavelengths of the spatial fringe patterns for 100 runs, with the error bars indicating one standard deviation from the mean. The measured wavelengths of the spatial fringe patterns are compared with calculated wavelengths according to $$\lambda_{fringe} = \frac{\pi T_{TOF}}{k \delta T},$$

where the wavelength is dependent on both the temporal asymmetry δT and $T_{TOF}$. The measured and calculated wavelengths of the spatial fringe patterns are in agreement.

Method 800 concludes at the conclusion of step 830.

Physical quantities such as local gravity, the gravitational constant, the fine structure constant, the ratio of Planck's constant to the atomic mass, rotation of the atom interferometer, acceleration of the atom interferometer, and the like can then be measured. The physical quantities are determined from the measured phase of the spatial fringe pattern using equation 3 below.

Theory of the Temporal Asymmetric Atom Interferometer 100

The atom source 110 releases cold or ultracold atoms from a trapping potential. The released atoms then freely fall under gravity in the interferometer region 120. The laser system 140 then directs light pulses separated by T1 and T2 to couple vertical momentum states of the atoms as shown in FIG. 3. This results in an overlap of the atoms travelling the two paths 210 and 220, where the total phase difference is:

$$\phi_{total} = \phi_{propagation} + \phi_{laser} + \phi_{separation} \quad (1)$$

where $\phi_{propagation}$ corresponds to the phase shift as the atoms travel through the interferometer region 120, $\phi_{laser}$ corresponds to the phase shift that occurs due to the light pulses from the laser system 140, and $\phi_{separation}$ corresponds to the phase shift due to finite separation of the quantum states of the atoms at the final light pulse.

In the case of an atom interferometer without spatial fringes where T1=T2 and the separation phase component is neglected, the total phase is:

$$\phi = \phi_{propagation} + \phi_{laser} \quad (2)$$

$$= n(k_{eff} g - 2\pi\alpha + \phi_L)T^2 \quad (3)$$

where n is the Bragg order (n=1 for Raman and n≥1 for Bragg), T is the time between the interferometer pulses (as illustrated in FIG. 3), $k_{eff}=4\pi/\lambda$ is the effective wavevector of the pulses of light of wavelength λ, $\phi_L$ is the phase of the light pulses relative to the inertial reference, g is an acceleration variable. The acceleration variable is used to determine the physical quantities such as local gravity, the gravitational constant, acceleration or rotation of the atom interferometer, and the like.

In order to compensate for the Doppler shift of the falling atoms, the frequency of the light pulses is swept at a rate α, and $\phi_L = \phi_1 - 2\phi_2 + \phi_3$ provides the phase of the light pulses relative to the inertial reference. The relative population in each of the two quantum states at the output can be monitored and the phase extracted and related to an inertial acceleration. As described above with reference to FIG. 2A, such measurement requires waiting for a separation delay to allow the quantum states to separate.

According to the present disclosure, the time periods between the light pulses are asymmetric (i.e., there is a temporal asymmetry δT) such that T2=T1±δT. In general the separation phase $\phi_{separation}$ has two components:

$$\phi_{separation} = \frac{\Delta x}{\hbar} \cdot \bar{p} + \frac{\Delta p}{\hbar} \cdot x \quad (4)$$

The first term $$\frac{\Delta x}{\hbar} \cdot \bar{p}$$

of Eq. 4 results from a slight spatial mismatch (Δx) at the final light pulse (i.e., the light pulse after T2). For an asymmetric Mach-Zehnder with a temporal asymmetry (i.e., the light pulses with temporal asymmetry), the separation is given by:

$$\Delta x = v_r \delta T = \frac{2\hbar k \Delta T}{m} \quad (5)$$

where $v_r$ is the recoil velocity.

The second term $$\frac{\Delta p}{\hbar} \cdot x$$

of Eq. 4 results from a spread of momentum across the atoms that, along with the temporal asymmetry ΔT, results in a spatially dependent phase at the final light pulse. In this case, the quantum states at the output display a sinusoidal modulation on top of the density envelope with a phase that is linked to the inertial acceleration. The wavenumber of the spatial fringe pattern $k_{fringe}$ is given by Δp/ℏ. The wavelength of the spatial fringe pattern is given by:

$$\lambda_{fringe} = \frac{2\pi}{k_{fringe}} = \frac{2\pi\hbar}{\Delta p} \quad (6)$$

Typically ΔP is unknown experimentally, but may be mapped to the known quantity Δx through ballistic expansion. Each velocity class in the atoms expands at x/t, thus mapping Δp→mΔx/t where t is total time allowed for expansion. This results in a spatial fringe wavelength given by:

$$\lambda_{fringe} = \frac{\pi T_{TOF}}{k \delta T} \quad (7)$$

where $T_{TOF}=T_0+T_1+T_2+T_{sep}$ is the total time of flight after release of the atoms from the atom source 110.

As discussed above in relation to FIG. 4, the wavelength of the spatial fringe pattern calculated using Eq. 7 is compared to the measured wavelength of the spatial fringe pattern and are shown to be in good agreement.

A slight deviation between the calculated and measured spatial fringe wavelength exists as depicted in FIG. 4. The inventors assume that this is likely due to a slightly different expansion rate caused by the Stern-Gerlach pulse used to separate the magnetic substates. It appears that an increase in temporal asymmetry $\delta T$ also results in a corresponding decrease in fringe contrast of the spatial fringe pattern, as the separation becomes large compared to the spatial coherence length of the atoms. The large spatio-temporal coherence of a Bose-Einstein condensate allows for larger values of the temporal asymmetry than a thermal cloud of atoms, and also larger interferometer times in the asymmetric setup.

The reduction in fringe contrast of the spatial fringe pattern as temporal asymmetry increases can be seen in FIG. 4. The decrease in fringe contrast limits the practical range of temporal asymmetry $\delta T$ to below 1 ms in the present arrangement. Given a relative velocity between both states of approximately 12 mm/s in this arrangement, this corresponds to a spatial separation at the final light pulse of ~10 μm.

In the present disclosure, imaging by the detector 130 is performed almost immediately after the final light pulse with the temporal asymmetry $\delta T$. The time between the final light pulse and detection is sufficient for the sinusoidal modulation on each cloud of atoms to overlap constructively. That is, the atoms are allowed to move a quarter of a wavelength apart to optimize the overlap of the quantum states of the atoms. The optimal separation time is given by $$t_{\pi/2} = \frac{\lambda/4}{v_r} = \frac{1}{8}\frac{m\pi T_{TOF}}{k^2\hbar\delta T} \quad (8)$$

where $v_r=2\hbar k/m$ is the recoil velocity. When $T_{TOF}=218$ ms, the optimal separation time is ~6 ms. When $T_{TOF}=722$ ms, the optimal separation time is ~15 ms. The phase can therefore be extracted with an increased signal-to-noise and without requiring full separation of the clouds of atoms.

Phase Noise

The phase noise of the asymmetric atom interferometer 100 will now be discussed. The phase noise of the atom interferometer 100 should not be substantially higher than conventional atom interferometers. The phase noises for both conventional atom interferometers with temporal symmetric of the light pulses and the atom interferometer 100 with temporal asymmetric are calculated using an Allan deviation. Calculation of the phase noise provides a means of quantifying the stability of a signal at various time and is defined as the square root of the Allan variance, $$\sigma_y^2(\tau) = \frac{1}{2(M-1)}\sum_{i=1}^{M-1}(y_{i+1}-y_i)^2 \quad (9)$$

for a set of M mean data points, $y_i$, obtained at average time $\mathcal{T}$. For this analysis, the data points $y_i$ correspond to the measured phase and the averaging time is given in units of runs, which correspond to the 11.4 seconds duty cycle of the experiment.

The phase from an interferometer without spatial fringes is obtained in the usual manner. That is, the signal is boxed around the two quantum states at the output and integrated with the relative population between the two quantum states is calculated. This is done for the entire dataset, before binning such that a full fringe can be fitted with a sinusoid of the form $$f(x)=V\sin(kx+\phi)+C \quad (10)$$

where k represents the frequency of the scan of laser phase, V represents the visibility, C represents a constant offset and $\phi$ provides the relevant phase value. The resulting phase signal can then be determined and the phase stability calculated. In practice, a conventional interferometer of this type is run mid-fringe, with a new fringe scanned whenever necessary. In this case 20 runs were required to extract a phase, limiting the minimum sampling rate shown in the Allan deviation of FIG. 6.

The phase of the spatial fringe pattern from the atom interferometer 100 is obtained by fitting the signal with a function incorporating a Gaussian envelope with a sinusoidal modulation of the form $$f(x) = A\exp\left[-\frac{(x-x_0)^2}{2\sigma_x^2}\right][1-B\sin(kx-\phi)]+C \quad (11)$$

where $y=\{A, x_0, \sigma_x, B, k, \phi, C\}$ are free parameters.

An initial fit is performed with the median value of the spatial wavelength subsequently input to a second round of fitting where this value is held constant. The total interferometer phase is given by $\phi$ of this final fit and can be related to the physical quantities mentioned above. In this case B is representative of the fringe visibility and is seen to decrease as the asymmetry increases.

Figure 5:
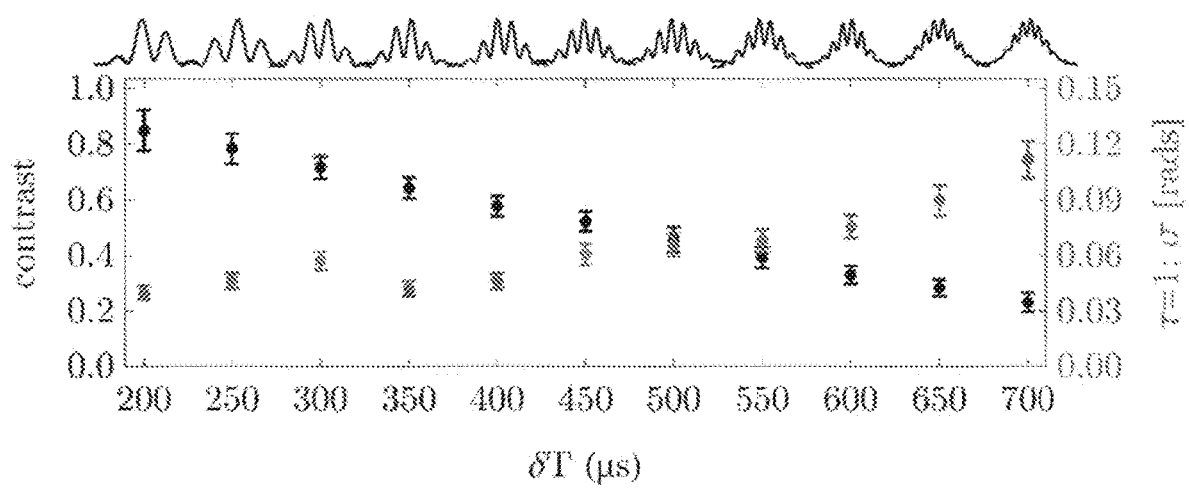
FIG. 5 shows a comparison of the phase noise of the atom interferometer of the present disclosure for varying spatial frequencies at different temporal asymmetry of the pulses.

The Allan deviation of the phase was calculated for various values of the spatial frequency over a 100 run acquisition, and is shown in FIG. 5. This indicates that, although higher spatial frequencies would be expected to provide a better determination of phase, the contrast of the spatial fringe patterns decreases correspondingly resulting in an increase in phase noise. In addition, higher spatial frequency increases the contribution of phase noise due to classical effects such as thermal expansion changing the position of the detector 130 over time. In general, lower spatial frequencies tend to have better phase stability, though this is limited when the fringe spacing becomes comparable to the size of the cloud. Relatively good phase stability coupled with a favorable ratio of fringe spacing to cloud size of the atoms is seen for the ~350 μs asymmetry, with this value being used for the remaining analysis.

FIG. 5 shows a comparison of the phase noise for varying spatial frequencies, obtained by changing the value of the temporal asymmetry $\delta T$. The phase noise tends to increase with increasing temporal asymmetry $\delta T$ indicating lower temporal asymmetry $\delta T$ provides a more optimal operation of the interferometer 100. The spatial frequency increases with increasing temporal asymmetry $\delta T$. The fringe contrast, indicated by the darker points, is also seen to decrease as the temporal asymmetry $\delta T$ increases, limiting the extent to which the temporal asymmetry $\delta T$ can be increased. These features are illustrated by example fringes shown with their associated $\delta T$ above the top horizontal axis. The size of the cloud of atoms provides a lower limit for the spatial frequency as the ability to extract phase information becomes an issue. The data represents the 1 run sampling rate with the phase noise calculated through the Allan deviation.

Before investigating the phase noise of the atom interferometer 100 with the temporal asymmetry, it is first verified that the temporal asymmetry of the light pulses does not add unwanted phase noise over the conventional temporal symmetric atom interferometer. In order to compare the interferometers with temporal asymmetry and temporal symmetry, 1000 runs were performed for each of the atom interferometers for T={1, 5, 10, 25, 50, 130} ms. The laser phase was scanned for both interferometer types, with the scan in the symmetric interferometer producing the sinusoidal signal described in Eq. 10, enabling the phase to be extracted. The laser phase in the asymmetric interferometer 100 manifests as a linearly increasing phase on the spatial fringe pattern that can subtracted from the signal. The Allan deviation of the phase was determined for both interferometer types and is shown in FIG. 6.

Figure 6:
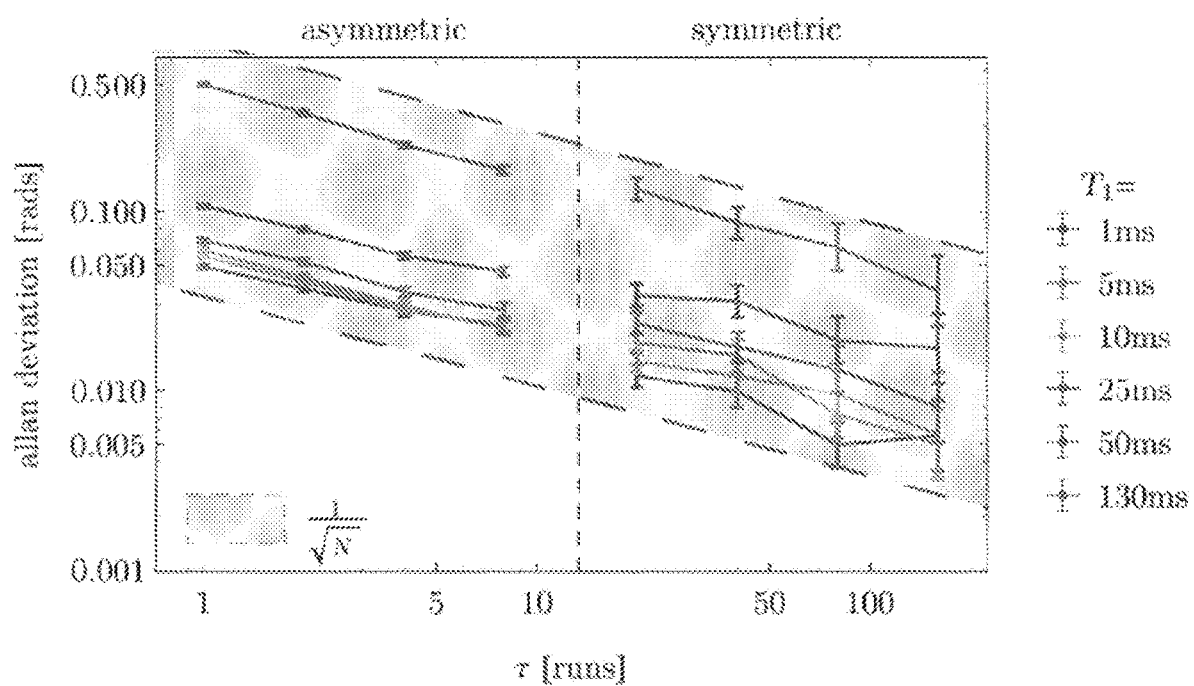
FIG. 6 shows a comparison of the phase noise between a symmetric and an asymmetric Mach-Zehnder atom interferometer.

FIG. 6 shows a comparison of the phase noise of the conventional temporal symmetric atom interferometer and the temporal asymmetric atom interferometer 100 as calculated through the Allan deviation. The phase for the temporal symmetric atom interferometer is obtained by scanning the phase of the laser then fitting a sinusoid to 20 points. The phase for the temporal asymmetric atom interferometer 100 is obtained each run by fitting the sinusoidal modulation. The trend for various interferometer times, T={1, 5, 10, 25, 50, 130} ms is seen to be the same between the two types of interferometers, with both following a $1/\sqrt{T}$ trend, as would be expected for white noise. The T=130 ms represents the phase from a spatial fringe pattern of the temporal asymmetric atom interferometer 100.

The asymmetric interferometer 100 and the symmetric interferometer follow the same trend. The symmetric interferometer requires multiple runs to generate a fringe for phase estimation. On the other hand, the asymmetric interferometer 100 requires a single shot to estimate phase and requires significantly lower sampling rates without compromising phase noise. In order to be useful for precision sensing applications, the phase noise of the temporal asymmetric interferometer 100 should be competitive with the conventional temporal asymmetric interferometer. In order to test this, 1000 measurements of phase were taken using the temporal asymmetric interferometer 100 and temporal symmetric interferometer.

The spatial fringe pattern was measured 19 ms after the final light pulse, whereby the two quantum states are added constructively. The time required for measuring the spatial fringe pattern may be calculated given the expected fringe spacing and the momentum difference of the two quantum states as given by Eq. 8. In practice, this is empirically optimized by monitoring the contrast in the resultant spatial fringe pattern.

Figure 7:
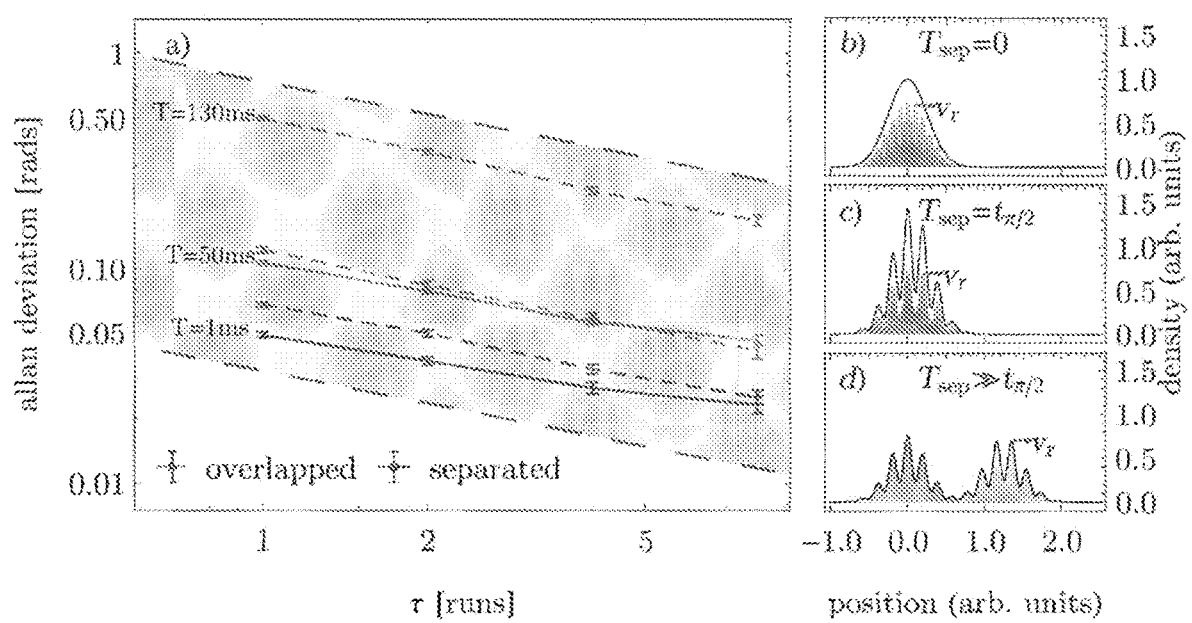
FIG. 7 shows a comparison of the phase noise for an overlapped and non-overlapped asymmetric Mach-Zehnder atom interferometer.

The Allan deviation for the output of the temporal asymmetric atom interferometer 100 for T={1; 50; 130} ms is shown in FIG. 7. FIG. 7 also shows the Allan deviation of the conventional temporal symmetric atom interferometer for T={1; 50} ms. No significant increase in phase noise is seen to occur due to the overlapping of the quantum states, and the $1/\sqrt{T}$ scaling remains even for large interferometer times Ti.

FIG. 7 shows a comparison of the phase noise for a temporal asymmetric atom interferometer 100 with overlapped quantum state output and a conventional asymmetric atom interferometer with separated quantum state outputs. The comparison is performed for T={1; 50} ms. For the temporal asymmetric atom interferometer 100, the temporal asymmetry $\delta T=130$ ms. The phase noise is equivalent between the two types of interferometers, suggesting that the temporal asymmetric atom interferometer 100 could be used to mitigate downtime without significantly increasing the phase noise. Parts b), c) and d) of FIG. 7 illustrate the operation of the two types of interferometers. At the final light pulse (i.e., the light pulse after time T2 of FIG. 3), the two quantum states are overlapped and out of phase with the imaged state showing no spatial modulation. Waiting $t_{\pi/2}$ results in the two quantum states moving spatially into phase resulting in a spatial fringe pattern with increased signal to noise as is the case for the dashed lines in a). Part c) shows the output after the two quantum states have separated fully as is the case in the solid lines of a).

In the arrangement, an increase in interferometer time from a maximum of T=130 ms (limited by separation time) to T=330 ms is allowed to significantly improve the potential sensitivity of the measurement. Further, the allowance in interferometer time would allow a smaller interferometer that maintains the same sensitivity.

Structure of Computer System 1300

Figure 9A:
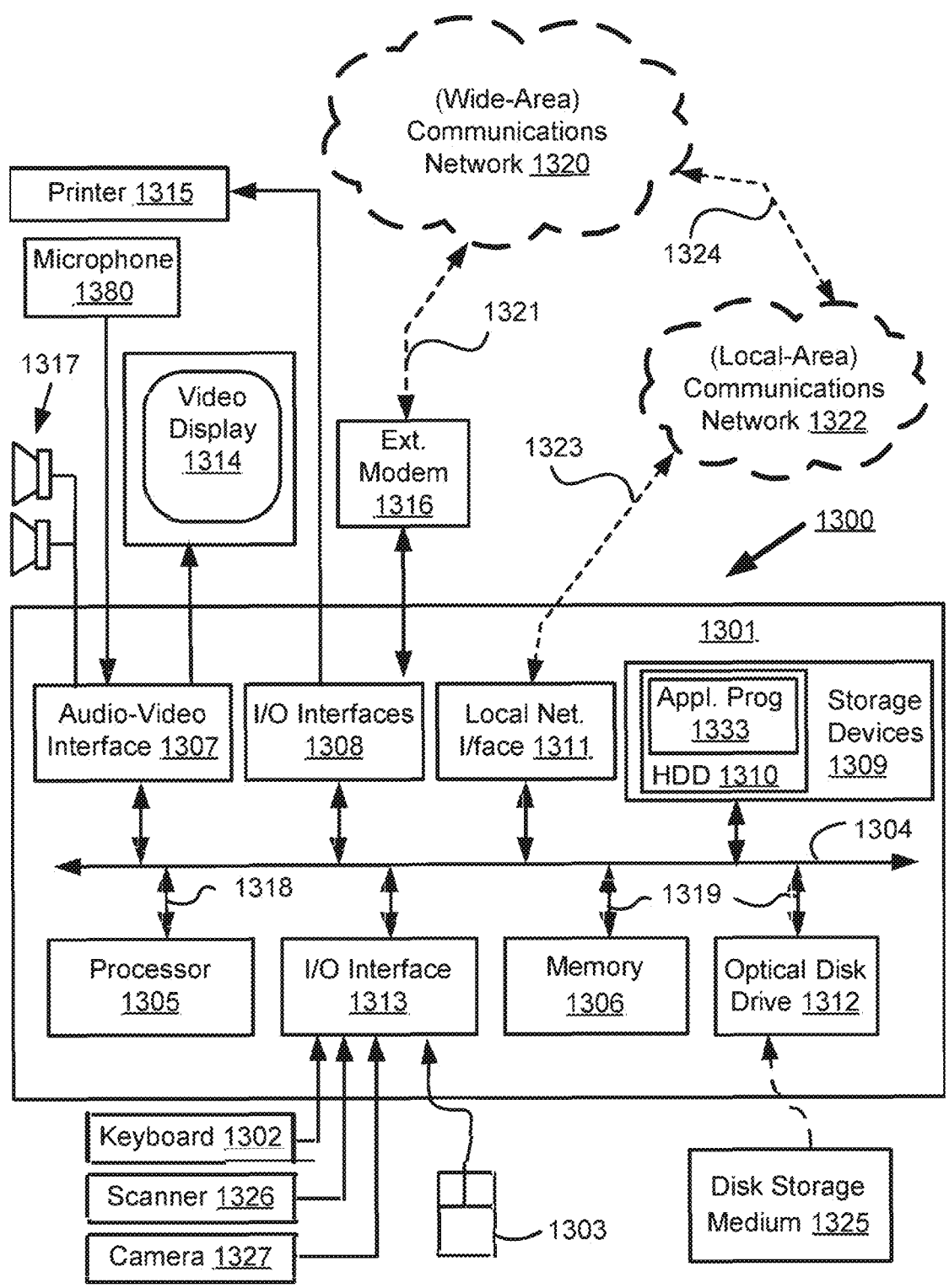
FIGS. 9A and 9B form a schematic block diagram of a general purpose computer system upon which arrangements described can be practiced.
Figure 9B:
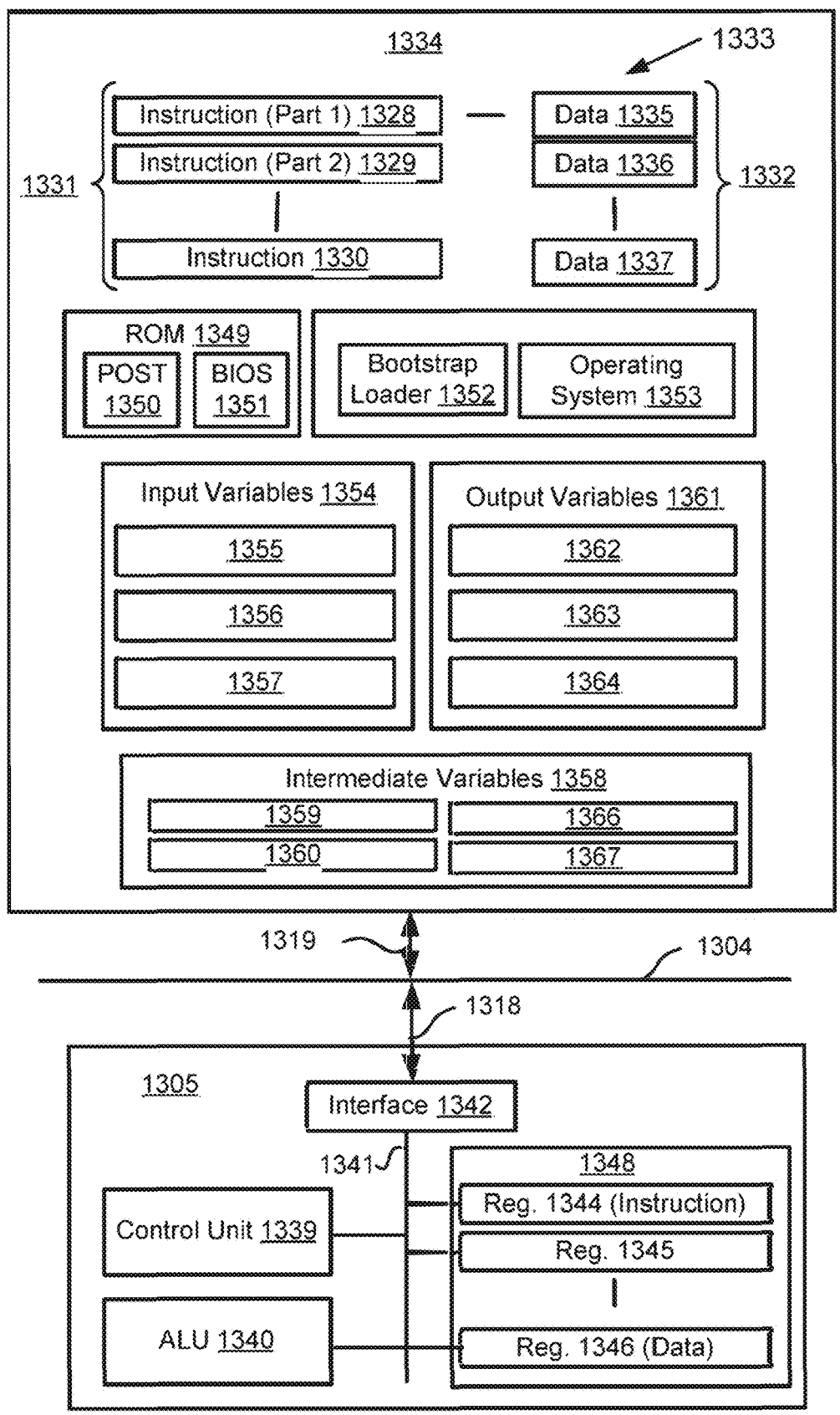

FIGS. 9A and 9B depict a general-purpose computer system 1300, upon which the various arrangements described can be practiced.

As seen in FIG. 9A, the computer system 1300 includes: a computer module 1301; input devices such as a keyboard 1302, a mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 9A, the local communications network 1322 may also couple to the wide network 1320 via a connection 1324, which would typically include a so-called "firewall" device or device of similar functionality. The local network interface 1311 may comprise an Ethernet circuit card, a Bluetooth® wireless arrangement or an IEEE 802.11 wireless arrangement; however, numerous other types of interfaces may be practiced for the interface 1311.

The atom source 110, the detector 130, and the laser system 140 may connect to the computer module 1301 via the networks 1320 or 1322, or the I/O interfaces 1308 or 1313.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple Mac™ or like computer systems.

The method of FIG. 8 may be implemented using the computer system 1300 wherein the processes may be controlled by one or more software application programs 1333 executable within the computer system 1300. In particular, the steps of the method of FIG. 8 are effected by instructions 1331 (see FIG. 9B) in the software 1333 that are carried out within the computer system 1300. The software instructions 1331 may be formed as one or more code modules, each for performing one or more particular tasks. The software may also be divided into two separate parts, in which a first part and the corresponding code modules performs the method for controlling the atom source 110, the detector 130, and the laser system 140 and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects an advantageous apparatus for atom interferometry.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably effects an apparatus for atom interferometry.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 9B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 9A.

When the computer module 1301 is initially powered up, a power-on self-test (POST) program 1350 executes. The POST program 1350 is typically stored in a ROM 1349 of the semiconductor memory 1306 of FIG. 9A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 9A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 9A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 9B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1305 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 9A. The execution of a set of the instructions may in some cases result in output of data. Execution may also involve storing data or variables to the memory 1334.

The disclosed atom interferometer arrangements use input variables 1354, which are stored in the memory 1334 in corresponding memory locations 1355, 1356, 1357. The input variables may be the temporal asymmetry δT. The atom interferometer arrangements produce output variables 1361, which are stored in the memory 1334 in corresponding memory locations 1362, 1363, 1364. The output may be control signals to control the atom source 110, the detector 130, and the laser system 140. Intermediate variables 1358 may be stored in memory locations 1359, 1360, 1366 and 1367.

Referring to the processor 1305 of FIG. 9B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

a fetch operation, which fetches or reads an instruction 1331 from a memory location 1328, 1329, 1330;

a decode operation in which the control unit 1339 determines which instruction has been fetched; and an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIG. 8 is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The method of controlling the atom interferometer 100 may alternatively be implemented in dedicated hardware such as one or more integrated circuits. Such dedicated hardware may include graphic processors, digital signal processors, a field-programmable gate array (FPGA), or one or more microprocessors and associated memories.

INDUSTRIAL APPLICABILITY

The arrangements described are applicable to operating an atom interferometer for measuring physical quantities such as local gravity, the gravitational constant, the fine structure constant, the ratio of Planck's constant to the atomic mass, rotation of the atom interferometer, acceleration of the atom interferometer, and the like using the overlapped spatial fringes.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. An atom interferometry acceleration measurement method comprising:

releasing atoms from an atom source into an interferometer region of a Bragg-transition atom interferometer;

directing pulses of light at the atoms to place the atoms in different quantum states and to recombine the quantum states such that the recombined quantum states interfere with each other when the quantum states are overlapped spatially, the recombined quantum states creating a combined spatial fringe pattern with a phase; and detecting the combined spatial fringe pattern and the phase of the combined spatial fringe pattern when the quantum states of the atoms at the outputs are overlapped spatially and the spatial fringe patterns of both output ports are in phase; and measuring, based on the detected combined spatial fringe pattern, the acceleration of the Bragg-transition atom interferometer.

2. The atom interferometry method of claim 1, wherein the time periods between the pulses are asymmetric to create the spatial fringe pattern.

3. The atom interferometry method of claim 1, wherein one or more of the light pulses are rotated relative to each other to create the spatial fringe pattern.

4. The atom interferometry method of claim 1, wherein the released atoms are from an atomic ensemble of thermal or Bose-Einstein condensate.

5. The atom interferometry method of claim 1, further comprising: measuring, based on the detected spatial fringe pattern, any one of a gravitational field, a gradient of a gravitational field, rotation of a device performing the atom interferometry method of claim 1, a magnetic field, a gradient of a magnetic field, and an electric field.

6. The atom interferometry method of claim 1, wherein the quantum states comprise any one of magnetic substates, hyper-fine states, angular momentum states, and linear momentum states.

7. A Bragg-transition atom interferometer comprising:
an atom source configured for releasing atoms from an atom source into an interferometer region;
a laser system configured for directing pulses of light at the atoms to place the atoms in different quantum states and to recombine the quantum states such that the recombined quantum states interfere with each other when the quantum states are overlapped spatially, the recombined quantum states creating a combined spatial fringe pattern with a phase; and
a detector configured for detecting the combined spatial fringe pattern and the phase of the combined spatial fringe pattern when the quantum states are overlapped spatially and the spatial fringe patterns of both outputs are in phase; and
a processor configured to measure acceleration of the Bragg-transition atom interferometer based on the combined detected fringe pattern.

8. The atom interferometer of claim 7, wherein the laser system is configured so that time periods between the pulses are asymmetric to create the spatial fringe pattern.

9. The atom interferometer of claim 7, wherein the laser system is configured so that one or more of the light pulses are rotated relative to each other to create the spatial fringe pattern.

10. The atom interferometer of claim 7, wherein the released atoms are from an atomic ensemble of thermal or Bose-Einstein condensate.

11. The atom interferometer of claim 7, wherein the atom interferometer measures, based on the detected spatial fringe pattern, any one of a gravitational field, a gradient of a gravitational field, rotation of the atom interferometer, a magnetic field, a gradient of a magnetic field, and an electric field.

12. The atom interferometer of claim 7, wherein the quantum states comprise any one of magnetic substates, hyper-fine states, angular momentum states, and linear momentum states.

13. The atom interferometer of claim 7, further comprising:
a controller configured for controlling the atom source, the laser system, and the detector.

14. A non-transitory computer readable medium comprising a computer application program that is executable by a processor, wherein the processor executes the computer application program to perform an atom interferometry acceleration measurement method comprising:
releasing atoms from an atom source into an interferometer region of a Bragg-transition atom interferometer;
directing pulses of light at the atoms to place the atoms in different quantum states and to recombine the quantum states such that the recombined quantum states interfere with each other when the quantum states are overlapped spatially, the recombined quantum states creating a combined spatial fringe pattern with a phase; and
detecting the combined spatial fringe pattern and the phase of the combined spatial fringe pattern when the quantum states of the atoms at the outputs are overlapped spatially and the spatial fringe patterns of both outputs are in phase; and
measuring, based on the detected combined spatial fringe pattern, the acceleration of the Bragg-transition atom interferometer.

15. The computer readable medium of claim 14, wherein time periods between the pulses are asymmetric to create the spatial fringe pattern.

16. The computer readable medium of claim 14, wherein one or more of the light pulses are rotated relative to each other to create the spatial fringe pattern.

17. The computer readable medium of claim 14, wherein the released atoms are from an atomic ensemble of thermal or Bose-Einstein condensate.

18. The computer readable medium of claim 14, wherein the method further comprises measuring based on the detected spatial fringe pattern, any one of a gravitational field, a gradient of a gravitational field, acceleration of a device performing the atom interferometry method of claim 14, rotation of a device performing the atom interferometry method of claim 14, a magnetic field, a gradient of a magnetic field, and an electric field.

19. The computer readable medium claim 14, wherein the quantum states comprise any one of magnetic sub states, hyper-fine states, angular momentum states, and linear momentum states.

* * * * *